E. E. EVERITT.

Bedstead Fastening.

No. 1,160. Reissued March 26, 1861.

WITNESSES:
Benj Morrison
Morton Roberts

INVENTOR.
Elisha C. Everitt.

N. PETERS, Photo-Lithographer, Washington, D. C.

UNITED STATES PATENT OFFICE.

ELISHA E. EVERITT, OF PHILADELPHIA, PENNSYLVANIA.

IMPROVED BEDSTEAD-FASTENING.

Specification forming part of Letters Patent No. 23,359, dated March 29, 1859; Reissue No. 1,160, dated March 26, 1861.

*To all whom it may concern:*

Be it known that I, ELISHA E. EVERITT, of Philadelphia, Pennsylvania, have invented certain new and useful Improvements in Bedstead-Fasteners; and I do hereby declare the following to be a full, clear, and exact description of the same, reference being had to the accompanying drawings, and to the letters of reference marked thereon.

My invention relates to that class of metallic fasteners for bedsteads which consist of dovetailed mortises and tenons; and my invention consists, first, in the combination of a tapering wedge-formed head or tenon with a tapering mortise, one being attached to the post and the other to the rail of a bedstead, the tenon being less than the mortise, and both being constructed and arranged in respect to each other substantially as described hereinafter, for the double purpose of readily tightening the rail to the post when the joint becomes loose through shrinkage and of forming a coupling capable of self-adjustment laterally; secondly, my invention consists of certain fins or ribs applied to the fastener as described hereinafter, for the purpose of effectually securing the above-mentioned mortise and tenon to the posts and rail.

In order to enable others familiar with this class of fasteners to make and use my invention, I will now proceed to describe its construction and operation.

Figure 1:
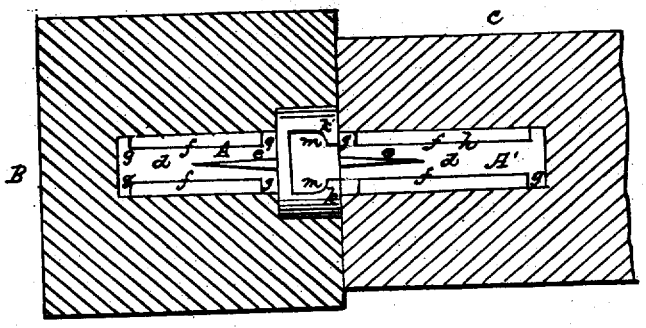
Figure 2:
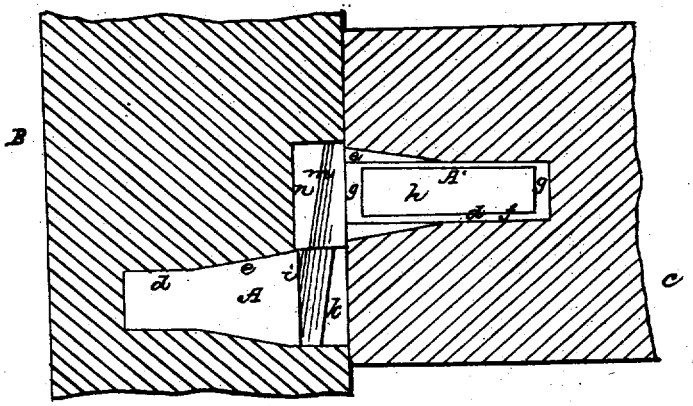
Figure 3:
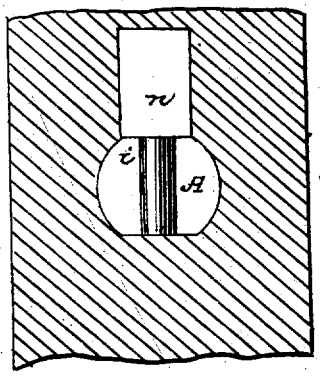
Figure 4:
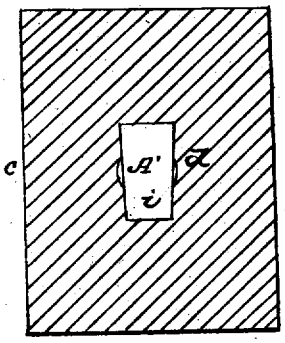

On reference to the accompanying drawings, which form a part of this specification, Figure 1 is a plan or top view of my improved bedstead-fastener, the post and a part of the rail of the bedstead being shown in section. Fig. 2 is a side view of Fig. 1, one portion of the fastener and parts of the post and rail being in section; Fig. 3, a front view of the post with its portion of the fastener, and Fig. 4 an end view of the rail with its portion of the fastener.

Similar letters refer to similar parts throughout the several views.

A and A′ are the two separate portions of the fastener, B a portion of the post, and C a portion of the rail, of the bedstead. Both portions A and A′ of the fastener are made of cast-iron, and each has an elongated stem, *d*, which has on the opposite sides depressions for the reception of the pieces of wood *h h*, the latter being of such a shape that with the stem they form a cylindrical or slightly-tapering plug adapted to a round hole bored either in the end of the rail or side of the post of the bedstead.

The outer end or head of the plug A is larger in diameter than its stem, and in this head is formed a tapering mortise, *i*, open in front, as seen in Figs. 1 and 3, and having two inclined planes, *k* and *k′*, which are curved transversely, as best observed on reference to Fig. 1.

The outer end or head, *l*, of the plug A′ consists of a tapering wedge-formed tenon of a shape corresponding with but somewhat less than the mortise formed in the head of the plug A, and this tenon has two inclined planes, *m m*, forming rounded wedge-formed shoulders for bearing against the inclined planes *k* and *k′* of the mortise of the plug A. The neck *t* of the plug A′—that is the portion between the head *l* and the stem—is somewhat less in width than the front opening of the mortise of the plug A, for a purpose which will be rendered apparent hereinafter.

A round hole of the proper size to receive the stem and head of the plug A is bored in the post of the bedstead, and glue being applied to the surface of the stem and its wooden pieces *h*, the plug is driven so far into the hole that the outer surface of its head is in the same plane with or slightly below the surface of the post. In like manner the stem of the plug A is driven into a hole in the rail so far that the head and neck only of the plug shall project beyond the said rail, as seen in Fig. 1.

A chamber or recess, *n*, of sufficient or somewhat more than sufficient size to admit the head and neck of the plug A′, is formed in the post above the head of the plug A, so that when the rail has to be connected to the post all that is necessary is to insert the head and neck of the plug A′ into the above-mentioned recess or chamber, as seen in Fig. 2, and then to depress the end of the rail, when the wedge-formed tenon on the end of the plug A′ will drop into the mortise formed in the head of the plug A, the neck *t* of the former plug passing into the opening in front of the mortise, and the inclined planes or shoulders *m* of the tenon bearing against the inclined planes *k* and *k'* of the mortise, so that the more the rail is depressed the tighter will it be drawn against the post.

In attaching the rail to the post as described above both portions of the fastening are necessarily subjected to more or less torsion and other strains, which have a tendency to overcome the tenacity of the glue and consequently to loosen the plugs. In order to obviate this difficulty I form on the stems of both plugs one or more wings or ribs *e*. In the present instance each plug has two ribs, one above and one below, although one simple rib on each plug would be sufficient.

When the plugs are driven into their respective holes, the ribs penetrate the solid wood and serve effectually to resist the torsion and strains above alluded to.

Dovetailed mortise-and-tenon fastenings have been heretofore used as a means of securing the rails to the posts of bedsteads. The tenons, however, have invariably fitted tightly and accurately into the mortises, so that when once tightened there was no possibility of retightening them when they became loose through the shrinking of the wood, &c. Moreover, if one part of the fastener attached to the post were not perfectly true with the other part attached to the rail, the tenon would not fit to the mortise without tedious adjustment of one or both parts.

It has been observed above that the tenon on the plug A', although corresponding in form with the mortise, is considerably less than the latter; in fact, one is so much less than the other that the tenon can, when the plugs are removed from the post and rail, pass halfway or thereabout through the mortise. The two plugs are so arranged in respect to the post and rail, however, that when first applied the top of the tenon will be slightly above the top of the mortise, so that when the junction of the rail and post becomes loose through the shrinkage of the wood or other cause the depression of the rail will at once tighten the joint, hence the importance of having the tenon smaller than the mortise.

It has also been observed that the neck *t* of the plug A' is less in width than the front opening of the mortise of the plug A, through which opening the neck has to pass. This looseness, together with the looseness of the tenon in the mortise, allows one plug a limited lateral movement independent of the other. The importance of this will be understood when it is borne in mind that the plug might be attached slightly out of truth either to the post or to the rail, which would cause an imperfect joint but for the above-described looseness. In other words, my improved fastening may be termed "self-accommodating," adjusting itself to any irregularity of the plugs, while the inclined shoulders of the tenon always bear against the inclined planes of the mortise, this self-adjustment being rendered certain by the rounding of the said shoulders and inclined planes. This portion of my improvement is independent of any peculiar mode of attaching the tenons and mortises to the post or rail, although I prefer the plug-fastening described as the most simple and efficient, especially when the plugs are furnished with the ribs above alluded to.

Having now described my invention and the manner in which the same may be applied, I wish it to be understood that I do not claim, broadly, securing the rails and posts of bedsteads together by dovetailed mortise-and-tenon fastenings; nor do I claim, broadly, securing a fastener to the post or rail by means of stems with wood at the sides; but

I claim as my invention and desire to secure by Letters Patent—

1. The combination of the tapering wedge-formed head or tenon *l* with the tapering mortise *i*, one being attached to the post and the other to the rail of a bedstead, when the said tenon is less than the mortise, and when both are constructed and arranged in respect to each other substantially as herein set forth, for the double purpose of readily tightening the rail to the post when the joint has become loose through shrinkage and of forming a coupling capable of self adjustment laterally, as specified.

2. One or more fins or ribs *e*, in combination with the plugs A and A', when these are constructed substantially as described.

In testimony whereof I have signed my name to this specification in the presence of two subscribing witnesses.

ELISHA E. EVERITT.

Witnesses:
HENRY HOWSON,
JOHN WHITE.